Aug. 21, 1956  T. HAMMOND ET AL  2,760,084
BURGLAR ALARM SYSTEMS
Filed Nov. 5, 1953
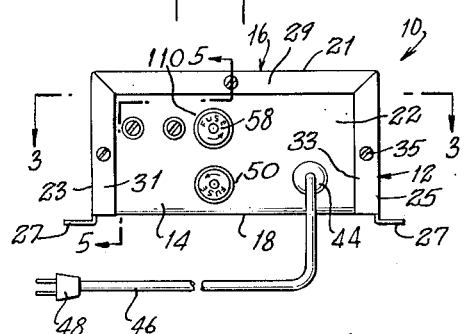
INVENTORS
TITUS HAMMOND
CHRISTY PRINCIPALE
BY
Henry L. Burkitt
ATTORNEY

United States Patent Office 2,760,084
Patented Aug. 21, 1956

2,760,084

BURGLAR ALARM SYSTEMS

Titus Hammond, Union City, N. J., and Christy Principale, Brooklyn, N. Y., assignors to Alarm Products, Inc., Union City, N. J., a corporation of New Jersey Application November 5, 1953, Serial No. 390,370

15 Claims. (Cl. 307—66)

This invention relates to burglar alarm systems.

Usually, commercial burglar alarm systems operate with batteries of dry cells as their source of energy. Batteries involve high cost of maintenance; additionally, as the batteries age, the voltage available falls off, and the reliability of the apparatus materially decreases. Attempts to utilize available alternating current as a direct power source have not been successful on a wide scale for many reasons.

It is an object of the invention to provide a low voltage, low cost power source for providing direct current at all times for an alarm system of the type indicated, which will operate with an ordinary alternating current power supply as its basic source.

It is an object of the invention to provide means for controlling automatically the delivery of current to a burglar alarm system wherein an alternating current is used as the primary source for providing direct current, so that, if such primary source is disabled for any reason, an auxilary direct current source, as, for instance, a battery, will be switched automatically into circuit, and thus direct current will be available at all times to operate the system.

It is an object of the invention to provide a compactly assembled power source, and a control assembly, for utilizing alternating current to produce rectified direct current, and to control the delivery of such rectified direct current and direct current derived from a source such as a battery selectively to the alarm and the bell-ringing circuits in accordance with the effectiveness of the alternating current source.

It is an object of the invention to provide a device of the type described, wherein a compactly arranged assembly may be installed for the purpose of utilizing rectified alternating current as a direct current source for a burglar alarm system, in a very cheap but efficient manner.

Other objects of the invention will be set forth hereinafter, or will be apparent from the description and the drawings, in which is illustrated an embodiment exemplifying the invention.

The invention, however, it not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiment, herein shown and described, is intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which is disclosed such a practical construction, Fig. 1 is a front elevational view of a power source embodying features of the invention;

Fig. 2 is a side elevational view of the power source shown in Fig. 1;

Fig. 3 is a transverse, cross-sectional view, substantially on the line 3—3 of Fig. 1, and to enlarged scale, illustrating the arrangement of the several parts in the housing;

Fig. 4 is a diagrammatic view, showing the disposition of the various parts of the apparatus, and its relation to the burglar alarm circuit and the power source, in accordance with the invention; and Fig. 5 is a vertical cross-sectional view, substantially on the line 5—5 of Fig. 1, of the housing structure, to reduced scale.

The power assembly 10, as shown in the drawings, may be retained within a housing 12, which may consist of a base member 14 and a cover member 16. Base member 14 may be made by bending a piece of sheet metal to provide a bottom wall 18 and a pair of upstanding walls 20 and 22. The distance between walls 20 and 22, by reason of the compactness of the elements to be described and their disposition, may be reduced to a minimum in order to keep the entire assembly as compact as possible. In one actual structure, the distance between walls 20 and 22, as well as the height of each of the walls, was less than three inches.

Cover member 16 may comprise a piece of metal bent to provide a top wall 21 and a pair of end walls 23 and 25. Walls 23 and 25 may terminate in footings 27. Flanges 29, 31, and 33 may be formed with walls 21, 23, and 25, respectively. Each of the flanges may have openings through which suitable attaching means, such as screws 35, may engage walls 20 and 22 which will be engaged snugly between the flanges.

On bottom wall 18 is carried a transformer 24 of the step-down type, capable of taking full line voltage, as, for instance, 110 volts, and stepping it down to a voltage usable in the burglar alarm circuit, as, for instance, about sixteen volts. The transformer may be of the usual type for such purposes, in this case being provided with a center tap 26.

Assembled on wall 20, and insulated therefrom, are plates 28 of a full wave rectifier 30. Wall 20 may be the rear wall of the housing 12 when the housing is assembled in a suitable casing. An opening 32 may be provided in wall 20; a bolt 34 and a nut 36, with suitable insulating bushings 38 and washers 40 may be utilized for the mounting of the rectifier, the bolt extending through opening 32.

Through an opening 42 in wall 22, which has an insulating bushing or grommet 44 held in the opening, may pass the power lines 46 from a usual alternating current power source. In the instance indicated, the cable of lines 46 is shown as terminating in the usual pronged plug connector 48 for reception in a receptacle. One line 46 may lead to a fuse 50 positioned in wall 22. For fuse 50, a receptacle 52 may be retained in wall 22, and line 46 may be secured to a terminal of the receptacle within the area 54 between walls 20 and 22. Cover 58 for the receptacle may be held in place by a bayonet connection; when a renewable fuse element (not shown) is positioned in the receptacle, and cover 58 is engaged properly, the fuse element will complete the circuit for the primary winding 60 of the transformer.

Also held in place on wall 22, but insulated therefrom in any accepted manner may be a relay 62, which may be of a type designated as a double-throw double pole relay. Any suitable device of this nature may be utilized in this circuit.

Through an opening 64 in wall 20, protected by a suitable grommet 44, may pass leads 66 from a power source such as a battery 68, which is positioned outside of housing 12, and, preferably, in a casing protected against illegal attack. Leads 66 may be protected in the conventional manner so that they may not be cut without initiating an alarm. The mechanism for this purpose is conventional.

Through another opening 70, likewise protected by a suitable grommet, may pass leads 72, 74, 76, and 78. Leads 76 and 78 are those extended from the protective circuit 80, which may take the usual form, being extended around the premises to present a continuous closed circuit with the power source. Leads 72 and 74 extend from the bell-ringing circuit 82 for alarm device 84 which may be conventional, and may include an alarm bell.

As now seen from the wiring diagram of Fig. 4, lines 46, with fuse 50 therein, are connected to primary winding 60 of transformer 24. From the secondary winding 86 of the transformer, leads are extended to plates 28 of full wave rectifier 30. A center tap 26 from winding 86 is extended to relay 62. As shown on the drawing, one terminal of coil 88 of relay 62 is connected to tap 26; this tap is also connected directly to a terminal contact 90, and, through a variable resistance 92, with another terminal contact 94. The relay has a pair of contact bars 96 and 98, insulated from each other, but moving together under the action of a gravity actuated armature 99 as energized by coil 88. Bars 96 and 98 normally tend to engage terminal contacts 100 and 102, respectively. When coil 88 is energized by rectified current from transformer 24 and rectifier 30, bars 96 and 98 engage contacts 90 and 94.

It will be noted that contact bar 96 is connected to bell-ringing circuit 82, while contact bar 98 is connected in protective circuit 80. Between contact bar 98 and the terminals for the protective circuit 80 is a fixed resistance 104. The return lines 74 and 76 for the bell-ringing and protective circuits, respectively, are in parallel, and are connected to one pole of the battery, as well as to one side of rectifier 30. A condenser 106 is connected across the leads of the protective circuit, for obvious purposes. A fuse 110, similar to fuse 50, may be connected in series with lead 74.

Resistance 92 is adjusted for each protective circuit to compensate for the differences between the impressed voltage obtained from the rectifier and the voltage derived from battery 68.

The full wave rectifier involved in this apparatus provides continuous direct current to the relay, and, in parallel with the relay, to the contact bars of the relay, so that, when current is being obtained from the rectifier, the relay will maintain the contact bars in position to pass current from the rectifier directly to the protective circuit, and also to make current available for operation of the bell-ringing circuit. The relay for operating the bell-ringing circuit, in the event of a break in the protective circuit, is not shown; it is to be assembled as apparatus outside of housing 12.

When current is being supplied by the rectifier, the relay will be energized by the current from the rectifier, and will hold the armatures in position to pass current from the rectifier through the protective circuit, and to exclude the battery from supplying energy either to the house or bell-ringing circuits. The contacts for the battery circuit are disengaged, and the battery remains completely ineffective at such time. Also, the circuit for ringing the bell will, in the case of a break in the protective circuit, derive its current from the rectifier, not the battery.

In the event that there is interruption of the alternating current being supplied to the transformer, relay coil 88 is de-energized, and the armature will fall to bring contact bars 96 and 98 into position to complete the circuit through contacts 100 and 102. This will bring battery 68 into action, to supply current to the protective circuit, and to be available for energizing the bell-ringing circuit. In the event that the alternating current power source is restored, the relay will again be energized to actuate contact bars 96 and 98 to break the circuit from battery 68, and put into circuit instantly, the power derived from the rectifier.

Whenever the protective circuit 80 is energized, resistance 104 is in circuit. Resistance 104 is of relatively low value, as, for instance, 100 ohms. When rectifier 30 is the power source for protective circuit 80, a much larger resistance 92 is cut into the circuit automatically. This resistance, which may be of the order of 5,000 ohms, may be adjusted to compensate for the greater voltage available from the rectifier as against the battery.

Many other changes could be effected in the particular constructions, and in the methods of use and construction, and in specific details thereof, hereinbefore set forth, without substantially departing from the invention intended to be defined herein, the specific description being merely of an embodiment capable of illustrating certain principles of the invention.

What is claimed as new and useful is:

1. A power source for a protective circuit and an alarm circuit, comprising a single casing having a base and a pair of side walls in opposition to each other, a transformer positioned on the base within the casing, a device for rectifying alternating current from the transformer to cause the current to flow substantially continuously in a single direction, the device being mounted on one side wall immediately adjacent the transformer, an auxiliary power source, means within the casing for maintaining the device in circuit when the transformer is energized, and for automatically placing the auxiliary power source in circuit when the transformer is not energized, the maintaining means being disposed upon the other side wall, and end walls for the casing and for engaging the side walls to hold them in relation to each other.

2. In combination with a protective circuit and an alarm circuit, of a single unit for supplying substantially unidirectional current to both circuits and for controlling the supply of current to the circuits, the unit comprising a device, the device providing means for rectifying alternating current, a casing for housing the device, a secondary power means disposed externally of the casing, and means housed by the casing for maintaining the secondary power means in stand-by relation to the rectifying means during the period that alternating current is supplied to the rectifying means.

3. In combination with a protective circuit and an alarm circuit, of a casing, a device wholly housed in the casing, the device providing means for supplying substantially unidirectional current to both circuits, said device including a transformer having a center tap for its secondary, and a low voltage rectifier connected in the secondary circuit of the transformer including said center tap, a secondary power means disposed externally of the casing, and means housed in the casing for maintaining the secondary power means in stand-by relation during the period that alternating current is supplied to the transformer.

4. In combination with a protective circuit and an alarm circuit, of a single device for supplying substantially unidirectional current, said device including means for rectifying alternating current, said rectifying means including a transformer, a center tap in the secondary winding of the transformer, a low voltage rectifier connected to the secondary winding of the transformer including the center tap, a secondary power means externally of the device, and means in the device effective so long as alternating current is being supplied to the transformer for directing substantially unidirectional current to both circuits in substantially parallel relationship, said directing means directing substantially direct current from the secondary power means to both circuits in substantially parallel relationship when alternating current is not supplied to the device.

5. In combination with a protective circuit and an alarm circuit, of a casing, a device wholly housed within the casing, the device providing means for supplying substantially unidirectional current, said device including a transformer disposed within the casing, the transformer having a center tap from its secondary winding, and a low voltage rectifier wholly within the casing and connected to the secondary winding of the transformer including said center tap, a secondary power means disposed externally of the casing, and means wholly within the casing and effective so long as alternating current is being supplied to the transformer for directing substantially unidirectional current from the rectifier to both circuits in substantially parallel relationship, said directing means connecting said secondary power means to both circuits in substantially parallel relationship when alternating current is not supplied to the transformer.

6. In combination with a protective circuit and an alarm circuit, of a single device for supplying substantially unidirectional current to both circuits, said device including means for rectifying alternating current, a secondary power means disposed externally of the device, means associated with the device for maintaining the secondary power means in stand-by relation to the rectifying means during the period that alternating current is supplied to the device, and means for compensating for differences in potential of the current derived from the rectification of the alternating current and from the secondary power means.

7. In combination with a protective circuit and an alarm circuit, of a casing housing a device for supplying substantially unidirectional current to both circuits, said device including means for rectifying alternating current, a secondary power means disposed externally of the casing, means in the casing for maintaining the secondary power means in stand-by relation to the rectifying means during the period that alternating current is supplied to the rectifying means, and means within the casing for compensating for differences in potential of the current derived from the rectification of the alternating current and from the secondary power means.

8. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and means for compensating for differences in potential of the current derived from the rectification of the alternating current and from the secondary power means.

9. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and means for compensating for differences in potential of the current derived from the rectification of the alternating current and from the secondary power means, said compensating means being introduced into the protective circuit when rectified current is being supplied by the rectifier.

10. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and means for variably compensating for differences in potential of the current derived from the rectification of the alternating current and from the secondary power means, said compensating means being introduced into the protective circuit when rectified current is being supplied by the rectifier.

11. In combination with a protective circuit and an alarm circuit, of a single device for supplying substantially unidirectional current to both circuits, said device including means for rectifying alternating current, a secondary power means disposed externally of the device, means associated with the device for maintaining the secondary power means in stand-by relation to the rectifying means during the period that alternating current is supplied to the device, and means for variably compensating for differences in potential of the current derived from the rectification of the alternating current and from the secondary power means.

12. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and resistance means for compensating for differences in potential of the current derived from the rectification of the alternating current and from the secondary power means.

13. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and variable resistance means for compensating for differences in potential of the current derived from the rectification of the alternating current and from the secondary power means.

14. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and resistance means, said directing means comprising means automatically to introduce the resistance means into the protective circuit when rectified current is being supplied by the rectifier.

15. In combination with a protective circuit and an alarm circuit, of a device for supplying substantially unidirectional current, said device including a transformer having a center tap for its secondary, and a low voltage rectifier connected in the secondary circuit of the transformer including said center tap, a secondary power means, means effective so long as alternating current is being supplied to the transformer for directing substantially unidirectional current from the rectifier to both circuits in substantially parallel relationship, said directing means connecting the secondary power means to both circuits in substantially parallel relationship when alternating current is not supplied to the device, and variable resistance means, said directing means comprising means automatically to introduce the resistance means into the protective circuit when rectified current is being supplied by the rectifier.

References Cited in the file of this patent

UNITED STATES PATENTS

| | | |
|---|---|---|
| 1,953,602 | Hanley | Apr. 3, 1934 |
| 2,062,274 | Rees | Nov. 24, 1936 |
| 2,080,504 | Raber | May 18, 1937 |